United States Patent [19]
Sanduja et al.

[11] Patent Number: 5,500,253
[45] Date of Patent: Mar. 19, 1996

[54] SUBSTRATE-REACTIVE COATING COMPOSITION

[75] Inventors: Mohan L. Sanduja, Flushing; Irene Berlina; Carl Horowitz, both of Brooklyn; Paul Thottathil, New Hyde Park, all of N.Y.

[73] Assignee: James A. Bolton, Stratford, Conn.

[21] Appl. No.: 369,366

[22] Filed: Jan. 6, 1995

Related U.S. Application Data

[62] Division of Ser. No. 50,849, Apr. 21, 1993, Pat. No. 5,439,969.

[51] Int. Cl.$^6$ .............................. B05D 3/00; C08F 20/02; C08L 75/04
[52] U.S. Cl. ............. 427/385.5; 427/393; 524/507; 524/533; 524/534; 524/457; 524/458; 524/403; 524/413; 524/435; 525/123; 525/455
[58] Field of Search ................... 524/507, 533, 524/534, 457, 458, 403, 413, 435; 525/123, 455; 427/385.5, 393

[56] References Cited

U.S. PATENT DOCUMENTS

| | | | |
|---|---|---|---|
| 3,401,049 | 9/1968 | Horowitz | 117/47 |
| 3,664,993 | 5/1972 | D'Alelio | 526/195 |
| 3,684,758 | 8/1972 | Honig et al. | 524/457 |
| 3,698,931 | 10/1972 | Horowitz | 117/47 |
| 3,974,107 | 8/1976 | Papa et al. | 528/80 |
| 4,171,387 | 10/1979 | Fogle | 425/54 |
| 4,180,645 | 12/1979 | Emmons et al. | 525/123 |
| 4,303,563 | 12/1981 | Emmons | 260/23 |
| 4,918,135 | 4/1990 | Probst et al. | 524/457 |
| 4,927,876 | 5/1990 | Coogan et al. | 524/507 |
| 4,988,753 | 1/1991 | Rullmann et al. | 524/458 |
| 5,041,487 | 8/1991 | Kissel | 524/458 |
| 5,087,690 | 2/1992 | DeMarey | 528/230 |
| 5,258,481 | 11/1993 | Hesslemans | 528/76 |
| 5,371,133 | 12/1994 | Stanley | 524/507 |

OTHER PUBLICATIONS

Spensol™ L—Product Bulletin (Textron)—1983.
Neorez™ R-960—Product Bulletin (ICI Resins)—1989.
Maincote™ AE-58—Product Bulletin (Rohm & Haas)—1990.
Neocryl A-612—Product Bulletin (Polyvinyl Chem. Inc.)—1989.

Primary Examiner—Paul R. Michl
Assistant Examiner—Andrew E. C. Merriam
Attorney, Agent, or Firm—Perman & Green

[57] ABSTRACT

Crosslinkable aqueous-based coating compositions are described which are covalently bonded to a wooden surface to which they are applied. The compositions contain a crosslinkable polymer, a mono and/or polyethylenically unsaturated monomer which can be graft polymerized onto cellulose molecules present in said wooden surface, a water soluble peroxy free radical polymerization catalyst, a source of cations capable of creating free radical sites in said cellulose molecules and, optionally, a crosslinking agent for said crosslinkable polymer. The coating may be air dried under ambient conditions to provide a crosslinked coating which is chemically bonded to the underlying wooden surface.

24 Claims, No Drawings

SUBSTRATE-REACTIVE COATING COMPOSITION

This is a divisional of application Ser. No. 08/050,849 filed on Apr. 21, 1993, now U.S. Pat. No. 5,439,969.

BACKGROUND OF THE INVENTION

1. Field of the Invention

The invention relates to curable coating compositions for substrates such as wood which are chemically bonded to the substrate.

2. Description of Related Art

It is generally known in the art that the surface properties of shaped articles such as polymeric films and fibers can be modified by graft polymerization processes wherein the article is treated with a free radical generating agent such as an organic peroxide or high energy radiation and then contacted with an ethylenically unsaturated monomeric material under conditions wherein the monomer or graft polymer chain is caused to be covalently bonded to the substrate.

One particular process involves the treatment of natural or synthetic polymer substrates containing active hydrogen with an aqueous solution containing a silver salt (silver nitrate), a free radical polymerization catalyst and a free radically polymerizable monomer. The silver salt acts upon the substrate to remove active hydrogen thereby creating active sites or free radicals along the molecular chain and initiating and propagating polymerization of the monomer in conjunction with the free radical polymerization catalyst. The resulting product is a graft copolymer comprising a substrate having a plurality of polymeric side chains covalently bonded thereto. Examples of such processes are disclosed in U.S. Pat. Nos. 3,401,049 and 3,698,931.

Although cellulose or wood is a substrate whose surface properties may be modified in accordance with the disclosure of the above referenced patents, this technology has not heretofore found application as means of providing a protective coating for wood products. The durability and weatherability of wood is limited because it is highly hydrophilic and is subject to attack by water, fungi and bacteria, particularly in outdoor applications. It is thus necessary to "seal" the wood by the application of protective coatings which form a barrier between the wood and the elements. The mere formation of grafted side chains on wood surfaces does not provide the degree of barrier protection needed to significantly prolong the life of the wood.

Typical protective coatings for wood include linseed oil, acrylic or polyurethane based paints and lacquers. However, these coatings are susceptible to abrasion, UV deterioration oxidation and permeation by moisture which limits their useful lifetime, particularly in outdoor applications. Also, adhesion to the wooden substrate may quickly deteriorate as a result of permeation by water, chemical attack, mildew, fungi and other causes.

Organic solvent-based coating compositions are known in the art based on compositions curable by condensation reactions and containing polymeric material such as hydroxy terminated polyesters, diesters, acrylics and alkyds and an amino or polyisocyanate crosslinking agent. These formulations are adapted to be applied to a substrate such as metal, heated to drive off the solvent and further heated at temperatures above 80° C. to activate the crosslinking mechanism. As such, these protective coatings find few practical applications on wood substrates because of the necessity to employ heat to activate the crosslinking mechanism. An example of a coating which is curable by condensation and free radical reactions is found in U.S. Pat. No. 5,087,690.

Wood coating formulations which can be cured without heat are also known in the art. For example, U.S. Pat. No. 4,171,387 discloses protective and decorative coatings for cellulose (wood) substrates based on a polyurethane base coat applied as a solution in organic solvent, which is further overcoated with an ultraviolet curable polyacrylic resin containing a photo-initiator. However, such coatings are also of limited interest due to the need to expose the coated surface to ultraviolet radiation to cure the composition.

Other coating formulations which may be cured at ambient or elevated temperatures are disclosed in U.S. Pat. No. 4,303,563. These are organic solvent based formulations containing an addition polymer which includes pendant primary or secondary amine groups and, as a crosslinking component, one or a mixture of monomers or prepolymers containing at least two unsaturated acryloxy groups.

Despite these developments, there exists a need to develop coatings, particularly coatings for wood, which can be cured at ambient temperatures, can be formulated without added organic solvents and which exhibit good initial and prolonged adhesion to the substrate and seal the substrate.

SUMMARY OF THE INVENTION

The present invention provides a reactive coating formulation for wood and other substrates in the form of an aqueous dispersion which comprises a mixture of:

a) a water dispersible polymer containing reactive functionality selected from the group consisting of hydroxy, epoxy, amide, carboxy and isocyanate functionality;

b) at least one mono- or polyethylenically unsaturated monomer;

c) an at least partially water soluble peroxy free radical polymerization catalyst; and d) a source of cations selected from the group consisting of $Ce^4$, $Ce^3$, $Fe^3$, $Fe^2$, $Co^2$, $Cu^2$ and $Ag^1$.

The composition also may contain a crosslinking agent for said water dispersible polymer and other ingredients commonly present in paint and lacquer formulations.

The coating compositions of the invention are designed such that, upon application to cellulose wood substrates or other substrates containing active hydrogen, a chemical reaction takes place wherein the ethylenically unsaturated monomer is grafted onto the substrate to form a single "mer" unit or a grafted side chain containing a plurality of polymerized "mer" units. These grafted units contain functional groups or ethylenically unsaturated groups which further react by ionic or free radical crosslinking reactions to produce a crosslinked coating which is attached to the underlying substrate by covalent bonds.

DESCRIPTION OF THE INVENTION

Monoethylenically unsaturated monomers which are suitable as components in the composition of this invention include those which contain hydroxy, carboxy or amino functionality. Examples of suitable monomers include acrylonitrile or methacrylonitrile, acrylamide or methacrylamide, N-vinyl caprolactam, N-vinyl carbazole, maleic anhydride, itaconic acid, vinyl acetate and like materials and mixtures thereof. Particularly preferred monoethylenically unsaturated monomers are acrylic acids and esters responding to the formula

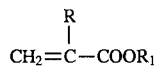

wherein R is either hydrogen or $C_1$ or $C_4$ alkyl and $R_1$ is selected from the group consisting of hydrogen, alkyl, aminoalkyl, hydroxyalkyl, hydroxyalkoxy and cycloalkyl groups having from 1 to about 20 carbon atoms. Examples of such monomers include acrylic or methacrylic acid, methyl acrylate or methacrylate, ethyl acrylate or methacrylate, butyl acrylate or methacrylate, hexyl or cyclohexyl acrylate or methacrylate, 2-ethylhexyl acrylate or methacrylate, hydroxyethyl or hydroxypropyl acrylate or methacrylate, dimethylaminoethyl acrylate or methacrylate, and alkylene glycol or polyalkylene glycol mono acrylates or methacrylates such as ethylene glycol acrylate or methacrylate, propylene glycol acrylate or methacrylate, polyethylene glycol acrylate or methacrylate, polypropylene glycol acrylate or methacrylate and like materials and mixtures thereof. The above monomers containing functional groups may be used in mixture with other monomers such as styrene, alpha-methyl styrene, vinyl or vinylidene chloride, vinyl ethers and the like to further modify the properties of the coating composition.

Polyethylenically unsaturated monomers which may be used in the coating composition include divinyl benzene, diallyl chloromethyl phosphonate, diallylbenzene phosphonate, diallyl dimethyl ammonium chloride and like materials and mixtures thereof. Particularly preferred of such monomers are acryloyl compounds having the structure:

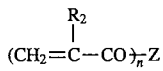

wherein $R_2$ is hydrogen or $C_1$–$C_2$ alkyl, n is 2, 3 or 4 and Z is the residuum of a polyol having from 2 to about 20 carbon atoms. Examples of suitable such monomers include ethylene glycol di(meth) acrylate, polyethylene glycol di(meth) acrylate, diethylene glycol di(meth) acrylate, propylene glycol di(meth) acrylate, polypropylene glycol di(meth) acrylate, trimethylene glycol di(meth) acrylate, neopentyl glycol di(meth) acrylate, 1,3-butylene glycol di(meth) acrylate, 1,4-butylene glycol di(meth) acrylate, 1,6-hexamethylene glycol di(meth) acrylate, 1,10-decamethylene glycol di(meth) acrylate, trimethylolpropane tri(meth) acrylate, pentaerythritol tetra (meth) acrylate, pentaerythritol tri(meth) acrylate, alkoxlated versions of the above and like materials, as well as mixtures thereof.

Mixtures of one or more of the above monoethylenically unsaturated monomers and one or more of the above polyethylenically unsaturated monomers may also be used, e.g., a mixture of hydroxyethyl acrylate and polyethylene glycol di(meth) acrylate.

The composition also contains a graft polymerization initiator which functions to abstract an active hydrogen atom from the molecules of substrate materials, e.g. wood or cellulose, to which the coating composition is applied, thereby creating a number of free radical sites along the molecular chains which serve as grafting sites for the unsaturated monomers present in the composition. In cellulosic materials such as wood, these active hydrogen atoms are present in the methylol ($CH_2OH$) groups which are pendant from the molecules; in polyamide polymer substrates the active hydrogen is the amido hydrogen; and in polypropylene polymer substrates the active hydrogen is attached to the central carbon atom of the three carbon atom propylene molecules. Creation of these radicals serves to initiate polymerization of the unsaturated monomer under ambient conditions, which is further propagated using a free radical polymerization catalyst.

Suitable graft polymerization initiators which are present in the composition include organic or inorganic salts of metals which dissociate in the presence of water to provide cations selected from the group consisting of $Ce^4$, $Ce^3$, $Fe^3$, $Fe^2$, $Co^2$, $Cu^2$ and $Ag^1$. Such salts include the acetates, sulfates, perchlorates, carbonates and nitrates. Silver nitrate is an especially preferred source of ions because it also has the serendipitous function of imparting bactericidal and fungicidal properties into the composition.

An at least partially water soluble peroxy free radical polymerization catalyst is also present in the composition. This catalyst is activated by the metal ion radical and serves to propagate graft polymerization at ambient conditions. Preferred catalysts include hydrogen peroxide, urea peroxide, peracetic acid, ammonium persulfate and potassium persulfate. Urea peroxide is the more preferred catalyst.

The mechanism for the graft reaction onto performed substrates using these reagents is more completely disclosed in U.S. Pat. Nos. 3,401,049 and 3,698,931, the complete disclosures of which are incorporated herein by reference.

The major component present in the composition of this invention is a water dispersible polymer or prepolymer containing reactive functionality selected from the group consisting of hydroxy, epoxy, amide, carboxy and isocyanate functionality. Typical of such polymers are acrylic polymer emulsions which are copolymers of one or more alkyl acrylates or methacrylates or mixtures thereof with ethylenically unsaturated monomers containing hydroxy, epoxy, amide, carboxy or isocyanate functionality, such as acrylic or methacrylic acid, acrylamide or methacrylamide or hydroxy-containing monomers such as a hydroxy alkyl acrylate or methacrylate, and allylalcohols. Typical of such acrylic polymers are copolymers and terpolymers containing one or a mixture of $C_1$ to $C_8$ alkyl acrylates or methacrylates such as methyl (meth) acrylate, ethyl (meth) acrylate, butyl (meth) acrylate, ethylhexyl (meth) acrylate and the like with up to about 10 wt. % of a functional acrylic monomer such as (meth) acrylic acid, hydroxyethyl(meth)acrylate or (meth)acrylamide.

Typical urethane polymers or prepolymers containing isocyanate functionality include water dispersible reaction products of an organic polyisocyanate such as toluene diisocyanate, hexamethylene diisocyanate, 4,4-diphenylmethane diisocyanate, 1,3-cyclopentylene diisocyanate and like materials with a polyol (diol, triol, tetrol) containing active hydrogen such as ethylene glycol, diethylene glycol, propylene glycol, neopentyl glycol, butane triol, pentaerythritol, mannitol, polyethylene glycol, polypropylene glycol and epoxidized oils.

Hybrid water dispersible prepolymers containing (meth) acryloyl functionality are also useful in the present invention. These are prepared by reaction of an acryloxy-containing compound such as (meth) acrylic acid, (meth) acryl halide, or a (meth) acrylic acid ester with various compounds such as hydroxy-containing alkyd resins, polyester condensates, polyisocyanates or polyether condensates. Examples include materials such as:

(A) Urethane acrylates obtained by reacting isocyanate groups of a polyisocyanate, such as hexamethylene diisocyanate with a hydroxyalkyl acrylate, e.g. hydroxyethyl acrylate. These polyurethane polyacrylate monomers are disclosed in U.S. Pat. No. 3,297,745.

(B) Polyether acrylates obtained by esterification of hydroxy-terminated polyethers with acrylic acid as disclosed in U.S. Pat. No. 3,380,831.

(C) Polyesters having at least two acrylate groups obtained by esterifying hydroxyl groups with acrylic acid as disclosed in U.S. Pat. No. 3,935,173.

(D) Polyfunctional acrylates disclosed in U.S. Pat. No. 3,560,237, e.g. obtained by reaction of a hydroxyalkyl acrylate, e.g. hydroxyethyl acrylate, with any one of:

(a) Dicarboxylic acids having from 4 to 15 carbon atoms, (b) Polyepoxides having terminal glycidyl groups, (c) Polyisocyanates having terminal reactive isocyanate groups.

(E) Acrylate-terminated polyesters made from acrylic acid, a polyol having at least three hydroxyl groups, and a dicarboxylic acid (U.S. Pat. No. 3,567,494).

(F) Polyacrylates obtained by the reaction of acrylic acid with at least two epoxy groups of epoxidized drying oils, such as soybean oil, linseed oil, and the like, e.g. epoxidized corresponding drying oil fatty acid, an ester or amide thereof, or the corresponding alcohol, containing at least 2 epoxy groups. Such polyfunctional acrylates are disclosed in U.S. Pat. No. 3,125,592.

(G) Polyacrylates which are urethane or amine derivatives of the polyacrylated epoxidized drying oils, fatty acids and the like described-in (F), obtained by the reaction of isocyanate(s) or amine(s) respectively with the polyacrylated epoxidized drying oils, fatty acids, and the like described in U.S. Pat. No. 3,125,592. The urethane and amine derivatives retain some or all of the acrylate groups and are disclosed in U.S. Pat. Nos. 3,876,518 and 3,878,077.

(H) Polyacrylates obtained by reaction of acrylic acid by addition to the epoxy groups of aromatic bisphenol-based epoxy resins as disclosed in U.S. Pat. No. 3,373,075.

(I) Polyacrylates obtained by the addition of acrylic acid to a linear vinyl polymer having pendant glycidyl groups, e.g. polymers of glycidyl acrylate or of vinyl glycidyl ether or vinyl glycidyl sulfide as disclosed in U.S. Pat. No. 3,530,100.

(J) Polyfunctional acrylates derived from acrylic acid anyhydride and polyepoxides as disclosed in U.S. Pat. No. 3,676,398.

(K) Polyfunctional acrylate urethane esters obtained from the combining of hydroxyalkyl acrylates, a diisocyanate, and a hydroxyl functional alkyd condensate as disclosed in U.S. Pat. No. 3,673,140.

(L) Acrylate terminated urethane polyesters obtained by reaction of a polycaprolactone diol or triol with an organic polyisocyanate, e.g. a diisocyanate, and a hydroxyalkyl acrylate. Such products are disclosed in U.S. Pat. No. 3,700,643.

(M) Urethane polyacrylates obtained by reaction of a hydroxyl-containing ester of a polyol with acrylic acid and a polyisocyanate, such as those described in U.S. Pat. No. 3,759,809.

These polymers contain functional groups which are capable of either reacting or interacting with functional groups present in the graft copolymer side chains covalently attached to the coated substrate to form ionic or hydrogen bonds, or they contain unsaturated groups which may participate in the free radical polymerization reaction to provide a crosslinked polymer network.

Where the polymeric component contains functional groups which are capable of undergoing ionic condensation reactions, e.g., carboxy, hydroxy or epoxy functionality, the composition may also include effective amounts of a crosslinking agent. Suitable crosslinking agents include melamine based amino resins such as hexamethoxymethylmelamine, benzoguanamine resins, urea formaldehyde resins, glycoluryl-based resins and like materials. Preferred crosslinking agents are those which are active at ambient temperatures, i.e., 20°–30° C. and include epoxy silanes such as gamma glycidoxypropyltrimethoxy silane, beta-(3, 4-epoxycyclohexyl) ethyltrimethoxy silane and polyfunctional aziridines. A preferred aziridine is a 1-aziridinepropanoic acid, 2-methl-, 2 ethyl-2-(3-(2-methyl-1-aziridinyl)-1-oxypropoxy)methyl)-1,3-propandiyl ester marketed by ICI Resins, Inc. under the tradename CX-100.

The composition of this invention may also include other ingredients in amounts which are commonly included in paint and lacquer formulations such as pigments, pigment extenders, wetting agents, surfactants, bactericides, fungicides, mildewicides, emulsifiers, suspending agents, flow control agents such as waxes or wax dispersions, level agents, thickening agents, pH control agents, slip agents such as silica or clay and the like.

Suitable pigments which may be included in the compositions of this invention are those opacifying pigments normally used in paint and coating formulations and include titanium dioxide, zirconium oxide, zircon, zinc oxide, iron oxide, antimony oxide, carbon black, as well as chrome yellows, greens, oranges and tile like. Preferred pigments include rutile $TiO_2$ and particularly weather resistant coated types of $TiO_2$. The pigments may also be blended with a suitable extender material which does not contribute significantly to hiding power. Suitable extenders include silica, baryte, calcium sulfate, magnesium silicate (talc), aluminum oxide, aluminum silicate, calcium silicate, calcium carbonate (mica), potassium aluminum silicate and other clays or clay-like materials. Where present, the pigments and extenders are normally present at a level of from about 0.1 to about 1.0 parts by weight per part by weight of the polymer components of the composition, on a dry weight basis.

The major organic component of the composition is the polymer or prepolymer component (a) which may be present at a level of from about 35 to about 95% by weight, on a dry weight basis, more preferably from about 50 to about 90% by weight. These polymers and prepolymers are formulated into the composition as water-based or water miscible solvent-based emulsions or dispersions containing the polymer component at a level generally in the range of from about 20 to about 45% by weight solids.

The mono-or polyethylenically unsaturated component (b) may be present in the dispersion at a level of from about 0.05 to about 5% by weight, more preferably from about 0.1 to about 2.5% by weight, based on the weight of the aqueous dispersion.

The concentration of the peroxy free radical catalyst component (c) added to the composition may generally range from about 0.0001 to about 0.1% by weight based on the weight of the aqueous dispersion, and is added to the composition preferably as a dilute solution in water.

The concentration of the metal salt component (d) may range from about 0.01 to 0.0001% by weight of the aqueous dispersion. It is preferably added at a level sufficient to provide from about 10 to about 100 ppm of dissociated cation species based on the weight of the aqueous dispersion.

The amount of the crosslinking component added to the composition may range from about 1 to about 15% by weight per 100 parts by weight of said water dispersible polymer, on a dry weight basis. The preferred level of addition is a stoichiometric level of from about 0.25 to about 2.0 equivalents, preferably about 1 equivalent, per equivalent of reactive functional groups present in the water dispersible polymer.

The components may be mixed by adding the monomers, free radical catalyst, graft initiator and other ingredients to the aqueous polymer emulsion or dispersion and stirring to obtain a uniform mixture. Where the composition includes a pigment, it is preferably added as an aqueous or acrylic polymer dispersion. Otherwise, the pigment should be added to the dispersion under high shear mixing conditions to insure a uniform dispersion of the pigment in the aqueous vehicle.

The pH of the formulated coating composition should preferably be in the range of from about 6–8, and appropriate amounts of a suitable acid, e.g. phosphoric or acetic acids or a base, e.g. sodium hydroxide, ammonia or ammonium hydroxide, may be included into the composition to adjust the pH as necessary.

The coating composition also preferably includes one or more surfactants or wetting agents which may be ionic or non-ionic in character. The presence of a wetting agent is particularly desirable to reduce surface tension and ensure uniform contact with the substrate. Where present, it is normally included at a level of from about 0.5 to about 10% by weight of the aqueous dispersion.

Where the composition includes a crosslinking component, this material is preferably not added to the aqueous composition until just before the composition is applied to the substrate to be coated. This avoids premature gelation or hardening of the composition over periods of storage.

The aqueous coating compositions of the invention will generally contain from about 40 to about 85% by weight of liquid carrier, i.e., water or a mixture of primarily water and water miscible organic solvents present in the water dispersible polymer, with the balance of the formulation being polymer solids, unsaturated monomers, pigment, wetting agents and the other ingredients which may be present in the composition. The viscosity of the composition may be adjusted either by further dilution with water or by the addition of thickening agents to provide paint viscosities appropriate for the particular method of application to the substrate, e.g., brush, roller, pressure pot spray or airless spray.

The composition may be applied to the substrate at a dry thickness of from about 0.5 to about 6 mils, preferably from about 2 to about 4 mils, by any suitable means such as spraying, brushing, roller coating and the like. After application, the coated substrate is permitted to dry at ambient temperatures, e.g., 20° to 35° C. The coating is normally dry to the touch and tack free in less than 5 minutes, generally in 2 to 3 minutes. Where the coating contains a cross linking agent activated by heat, it may be necessary to bake the coated substrate at temperatures above 100° C. to cure the coating.

Substrates which may be coated include cellulose and polymeric substrates which contain active hydrogen in the polymer molecules. Such substrates include wooden articles such as panels, window frames, flooring, siding and decorative articles such as shutters. Preshaped articles made from polymers such as nylon or polypropylene may also serve as suitable substrates.

The coatings of the present invention offer numerous advantages over conventional protective coatings. They are free of hydrocarbon solvents except for organics such as ethers and esters and water miscible organo amine solvents which are present as impurities or carriers for the various components. This offers obvious environmental and safety advantages. The dried coatings are extremely durable and water resistant due to the hydrophobic properties of the crosslinked coatings and impart UV resistance, abrasion resistance and anti-mildew, anti-fungicide and anti-spalling properties to the underlying substrate.

The following examples illustrate coating compositions which are suitable for use in the present invention. Components used in these formulations are as follows:

CYDROTHANE HP™ is a polyurethane-polyester polymer aqueous dispersion based on an aliphatic diisocyante and containing carboxy/hydroxy functionality marketed by American Cyanamide Co. having a total solids content of 35% resin and a pH in the range of 9.5–10.0.

MAINCOTE™ AE-58 is a hydroxy functional acrylic resin aqueous dispersion available from Rohm and Haas Co. having a total solids content of 42.5% resin and a pH of 7.5.

SPENSOL™ L-51 is a carboxy-functional polyurethane dispersion available from Textron, Inc. having a solids content of 30% by weight and a pH of 8.5

NEOCRYL™ A-612 is an aqueous acrylic emulsion containing carboxy functionality marketed by Polyvinyl Chemical Industries having a total solids content of 32% by weight, a pH of 7.7 and a content of naphta and alkoxy polyols of about 14% by weight.

NEOREZ™ R-960 is a polyurethane dispersion in N-methyl pyrrolidone and water having a total solids content of 33% by weight, a pH of 8.3 and an acid number on solids of 30.

CX-100™ is a polyfunctional aziridine liquid crosslinking agent marketed by ICI Resins U.S., Inc.

Other components present in the formulations are identified by tradename at first occurrence in the examples. These are well known materials such as surfactants, pigments, wetting agents, flatting agents, flow control agents, viscosity control additives (thickeners) and the like which are used in paint formulations.

These formations were prepared by placing the indicated quantity of polymer dispersion into a laboratory mixer and mixing in the monomers, pigments, peroxide, silver nitrate initiator and other ingredients set forth in examples I–VI.

EXAMPLE I

|  | PARTS BY WEIGHT |
|---|---|
| CYDROTHANE ™ HP | 60.00 |
| Titanium dioxide slurry (TIPURE ™ 742) | 20.00 |
| Ethoxylated Trimethylol Propane triacrylate | 0.50 |
| Polyethylene glycol (400) diacrylate | 0.50 |
| Polyaziridine cross linker (CX-100) | 0.70 |
| Acrylic Thickening Agent (ZIOTHIX ™ 96) | 3.00 |
| Urea peroxide 1% solution in water | 0.10 |
| Silver nitrate 0.1% solution in water | 0.10 |

EXAMPLE II

|  | PARTS BY WEIGHT |
|---|---|
| MAINCOTE ™ 58 | 50.00 |
| CYDROTHANE ™ HP | 50.00 |
| Wax emulsion (POLY EM ™-40) | 6.00 |
| Wax dispersion (SLIP-AYD ™ SL-300) | 10.00 |
| Titanium dioxide slurry | 5.00 |
| Titanium dioxide acrylic dispersion (TINT-AYD ™ WD2002) | 15.00 |
| Acrylic thickener (ACRYSOL ™ ASE -60) | 0.75 |
| Ammonia/water solution (1:1) | 3.75 |
| Fluorosurfactant (AQUA BEAD ™ | 5.00 |

-continued

| | PARTS BY WEIGHT |
|---|---|
| 418E) | |
| Hydroxy ethyl acrylate | 0.50 |
| Polyethylene glycol dimethacrylate | 0.50 |
| Urea peroxide 1% solution in water | 0.10 |
| Silver nitrate 0.1% solution in water | 0.10 |

EXAMPLE III

| | PARTS BY WEIGHT |
|---|---|
| CYDROTHANE ™ HP | 100.00 |
| Fluorosurfactant | 5.00 |
| Wax emulsion | 5.00 |
| Wax Dispersion | 10.00 |
| Titanium dioxide slurry | 10.00 |
| Titanium dioxide dispersion | 10.00 |
| Colloidal silica (CABOSPERSE ™ A-205) | 10.00 |
| Ammonia/water solution (1:1) | 13.00 |
| Polysiloxane wetting agent (BYK ™ -341) | 1.00 |
| Colloid thickener (ALCOGUM ™ 9440) | 1.50 |
| Polyaziridine cross linker | 3.00 |
| Ethoxylated trimethylol propane triacylate | 0.50 |
| Polyethylene glycol (400) diacrylate | 0.50 |
| Urea peroxide 1% solution in water | 0.10 |
| Silver perchlorate 0.1% solution in water | 0.10 |

EXAMPLE IV

| | PARTS BY WEIGHT |
|---|---|
| SPENSOL ™ L-51 | 79.00 |
| CYDROTHANE ™ HP | 10.00 |
| Deionized water | 0.17 |
| Ammonium hydroxide | 0.05 |
| Alkyd resin (AROLON ™ 860) | 20.25 |
| Surfactant (SURFANOL ™ 104H) | 0.66 |
| Wax dispersion | 5.00 |
| Titanium dioxide slurry | 10.00 |
| Fluorosurfactant | 5.00 |
| Acrylic thickening agent | 1.00 |
| Ammonia (28% aqueous sol.) | 1.00 |
| Hydroxy ethyl acrylate | 0.50 |
| Polypropylene glycol monomethacrylate | 0.50 |
| Urea peroxide 1% solution in water | 0.10 |
| Silver perchlorate 0.1% solution in water | 0.10 |

EXAMPLE V

| | PARTS BY WEIGHT |
|---|---|
| CYDROTHANE ™ HP | 100.00 |
| Fluorosurfactant | 5.00 |
| Wax emulsion | 6.00 |
| Wax dispersion | 10.00 |
| Titanium dioxide slurry | 10.00 |
| Titanium dioxide dispersion | 10.00 |
| Colloidal silica (CAB-O-SPERSE ™ A205) | 10.00 |
| Polysiloxane wetting agent | 1.00 |
| Polyaziridine cross linker | 0.50 |
| NEOREZ ™ 960 | 5.00 |
| Ethoxylated trimethylol propane triacrylate | 1.00 |
| Polyethylene glycol (400) diacrylate | 1.00 |
| Polyethylene glycol dimethacrylate | 0.50 |
| Urea peroxide 1% solution in water | 0.10 |
| Silver nitrate 0.1% solution in water | 0.10 |

EXAMPLE VI

| | PARTS BY WEIGHT |
|---|---|
| NEOREZ ™ R-960 | 80.00 |
| NEOCRYL ™ A 612 | 20.00 |
| Titanium dioxide (UNITANE ™ O-110) | 10.00 |
| Titanium dioxide dispersion | 20.00 |
| Surfactant (TRIONIC ™ 701) | 10.00 |
| Polyaziridine crosslinker | 2.00 |
| Polyethylene glycol (400) diacrylate | 0.20 |
| Ethoxylated trimethylol propane triacrylate | 0.20 |
| Urea peroxide 1% solution in water | 0.10 |
| Silver nitrate 0.1% solution in water | 0.10 |

Each of the formulations prepared in Examples I–VI were uniformly sprayed onto one surface of 12" by 12" unprimed wooden panels and permitted to dry at about 32° C. for about 5 minutes. All samples containing polyaziridine crosslinker were essentially tack-free after about 2–3 minutes. All coatings were found to be well adhered to the underlying wooden surface as reflected by an inability to scratch off the coating from the wooden surface with a pencil tip.

The following example illustrates the excellent weathering, moisture resistance and substrate adhesion properties of the coating formulations of the present invention.

EXAMPLE VII

Immediately after formulation, the coating composition of example VI was uniformly sprayed onto the various surfaces of unprimed wooden panels to form sets as described below, and dried at 32° C. for five minutes. The samples were then aged at room temperature for several days. Final coating thickness was found to be in the order of 3–4 mils.

The coated wooden sets were as follows:

SET 1: Six (6) samples, 12"×13"×½" were coated on one 3"×12" face and numbered Samples 1 through 6.

SET 2: Six (6) samples, 12"×3"×¾" were coated on all sides and faces and numbered Samples 1 through 6.

SET 3: Six (6) samples, 16"×4½"×⅜" were coated on one 16"×4½" face and numbered Samples 1 through 6.

The coated wooden samples were subjected to three testing procedures as follows:

PROCEDURE 1

Samples 1 through 6 of Set 1 were subjected to accelerated weathering in general accordance with ASTM E73-88, *Standard Test Methods for Seal Durability of Sealed Insulating Glass Units*. The time of exposure was five weeks which was equivalent to 140 six-hour weather cycles. Evaluation of the specimens before and after weathering was performed in accordance to ASTM-D523-89, *Standard Test Method for Specular Gloss*.

PROCEDURE 2

Samples 1 through 6 of Set 2 were tested in general accordance with ASTDM D870-87, *Standard Practice for Testing Water Resistance of Coatings Using Water Immersion*. The evaluation of the samples was performed as follows: Each sample was dried in a 150° F. convective oven prior to immersion. The "dry" weight was then determined and recorded. The samples were then immersed in distilled water for 72 hours. At the conclusion of the immersion test, the "wet" weight was determined and recorded. The percent absorption was calculated based on dry weight.

PROCEDURE 3

Samples 1 through 6 of Set 3 were tested in general accordance with ASTM D2486-89, *Standard Test Method for Scrub Resistance of Interior Latex Flat Wall Paints*. Evaluation was based on the number of scrub cycles needed to expose the bare wood.

Procedure 1 was performed on Step 1 in the weatherometer using an ultra-violet light source over a five week period with the following results:

| Samples No. | Pre-Weathering Gloss Reading | Post-Weathering Gloss Reading |
|---|---|---|
| 1 | 30.8 | 27.7 |
| 2 | 35.9 | 35.4 |
| 3 | 31.2 | 21.0 |
| 4 | 34.2 | 32.9 |
| 5 | 39.0 | 36.8 |
| 6 | 37.4 | 35.5 |

All samples except for #3 exhibited a post-weathering gloss retention of about 90% or better. The surface appearance of all samples was essentially unchanged at the conclusion of the test except that very slight yellow streaking was observed on all samples after the 5 week period. These results are also indicative of the resistance of the coating to ultra-violet degradation.

Procedure 2 was performed on Set 2 over the 72 hour period with the following results:

| Samples No. | Pre-Immersion "Dry" Weight (grams) | Post-Immersion "Wet" Weight (grams) | % Absorption |
|---|---|---|---|
| 1 | 207.13 | 211.82 | 2.26 |
| 2 | 198.15 | 239.00 | 20.26* |
| 3 | 197.90 | 205.59 | 3.89 |
| 4 | 200.82 | 205.64 | 2.40 |
| 5 | 197.37 | 202.27 | 2.48 |
| 6 | 197.53 | 202.36 | 2.45 |

*Note:
Sample No. 2 was observed to have voids in the coating exposing the end-grain to direct contact with the water.

These test results demonstrate the excellent sealing properties and substrate adhesion properties of the formulations of the invention. Uncoated wood panels would absorb a minimum of 50 to 100% water at the conclusion of the test. The observation of only very slight yellow streaking on the surfaces of all samples after 72 hours is indicative of excellent resistance to attack by mildew.

Procedure 3 was performed on Set 3. After exposure to 10,000 scrub cycles as described in ASTM D2486, Section 8, a definite area of wear was observed in the scrub path of the brush, but no complete wear-through to expose the underlying wooden surface was observed in any sample. These test results are indicative of the excellent hardness and abrasion resistance of the coatings of this invention as well as excellent adhesion to the underlying wooden substrate.

What is claimed is:

1. A process for forming a protective coating which is bonded to a surface comprising applying a coating composition to said surface and drying said coating, said coating composition being an aqueous dispersion comprising a mixture of:
   (a) a water dispersible polymer selected from the group consisting of acrylic polymers, urethane polymers and mixtures thereof;
   (b) at least one polyethylenically unsaturated monomer;
   (c) an at least partially water-soluble free radical polymerization catalyst; and
   (d) a source of cations selected from the group consisting of $Ce^4$, $Ce^3$, $Fe^3$, $Fe^2$, $Co^2$, $Cu^2$ and $Ag^1$;

said coating composition containing from about 40 to about 85% by weight water.

2. The process of claim 1 wherein said coating composition further contains a crosslinking agent for said water dispersible polymer in an amount effective to crosslink said polymer.

3. The process of claim 2 wherein said crosslinking agent is a polyfunctional aziridine compound.

4. The process of claim 3 wherein said surface is wood.

5. The process of claim 1 wherein component (b) also comprises at least one monoethylenically unsaturated monomer having the structure:

$$CH_2{=}C(R){-}COOR_1,$$

wherein R is either hydrogen or $C_1$ to $C_4$ alkyl and $R_1$ is selected from the group consisting of hydrogen, alkyl, hydroxyalkyl, hydroxyalkoxy, aminoalkyl and cycloalkyl groups having from 1 to about 20 carbon atoms.

6. The process of claim 5 wherein $R_1$ is hydroxyalkyl or hydroxyalkoxy.

7. The process of claim 1 wherein component (b) is at least one acryloyl monomer having the structure:

$$(CH_2{=}C(R_2){-}CO)_n Z$$

wherein $R_2$ is hydrogen or $C_1$–$C_2$ alkyl, n is 2, 3 or 4 and Z is the residuum of a polyol having from 2 to about 20 carbon atoms.

8. The process of claim 7 wherein n is 2 and Z is the residuum of a polyol selected from the group consisting of ethylene glycol, propylene glycol, polyethylene glycol and polypropylene glycol.

9. The process of claim 1 wherein said water dispersible polymer contains carboxyl functionality.

10. The process of claim 1 wherein said at least partially water soluble catalyst is selected from the group consisting of hydrogen peroxide, urea peroxide, peracetic acid, ammonium persulfate and potassium persulfate.

11. The process of claim 10 wherein said catalyst is urea peroxide.

12. The process of claim 1 wherein said source of cations is silver nitrate.

13. The process of claim 2 wherein said crosslinking agent is present at a stoichiometric level of from about 0.25 to about 2.0 equivalents per equivalent of reactive functional groups present in said water dispersible polymer.

14. The process of claim 3 wherein said composition contains from about 1 to about 15% by weight of said aziridine crosslinking agent per 100 parts by weight of said water dispersible polymer on a dry weight basis.

15. The process of claim 7 wherein component (b) comprises polyethylene glycol diacrylate.

16. The process of claim 7 wherein component (b) comprises ethyoxylated trimethylol propane triacylate.

17. The process of claim 1 wherein said source of cations is present in said composition in an amount sufficient to provide from about 10 about 100 ppm of cation.

18. The process of claim 17 wherein said source of cations is silver nitrate.

19. The process of claim 1 wherein said water dispersible polymer is present in said composition at a level of from about 35 to about 95% by weight, on a dry weight basis.

20. The process of claim 1 wherein component (b) is present in said composition at a level of from about 0.05 to about 5% by weight of said composition.

21. A process for forming a protective coating bonded to a wooden surface comprising applying a coating composition to a wooden surface and permitting said coating to air dry at ambient conditions, said coating composition being an aqueous dispersion comprising a mixture of:

(a) a water dispersible polymer selected from the group consisting of acrylic polymers, urethane polymers and mixtures thereof containing functional groups which are reactive under ambient conditions with a polyfunctional aziridine crosslinking agent;

(b) at least one di or tri acrylate or methacrylate ester;

(c) urea peroxide;

(d) silver nitrate; and (e) a polyfunctional aziridine crosslinking agent;

said composition containing from about 75 to about 95% by weight of component (a), on a dry weight basis; from about 0.05 to about 5% by weight of component (b); from about 0.0001 to about 0.1% by weight of component (c); from about 0.0001 to about 0.01% by weight of component (d); and from about 1 to about 15% by weight of component (e) per 100 parts by weight of component (a), on a dry weight basis, said coating composition containing from about 40 to about 85% by weight water.

22. A coated surface prepared by the process of claim 1, wherein said surface is wood.

23. A process for forming a protective coating which is bonded to a wooden surface comprising applying a coating to said wooden surface and drying said coating, said coating comprising an aqueous dispersion prepared by mixing:

a) a water dispersible polymer selected from the group consisting of acrylic polymers, urethane polymers and mixtures thereof;

b) at least 0.05 wt. % of at least one mono- or polyethylenically unsaturated monomer;

c) an at least partially water-soluble free radical polymerization catalyst;

d) a source of cations selected from the group consisting of $Ce^4$, $Ce^3$, $Fe^3$, $Fe^2$, $Co^2$, $Cu^2$ and $A^1$; and e) a crosslinking agent for said water dispersible polymer added in an amount effective to crosslink said composition;

said coating composition containing from about 40 to about 85% by weight water.

24. The process of claim 23 wherein said crosslinking agent is a polyfunctional aziridine compound.

\* \* \* \* \*

UNITED STATES PATENT AND TRADEMARK OFFICE
CERTIFICATE OF CORRECTION

PATENT NO. : 5,500,253
DATED : Mar. 19, 1996
INVENTOR(S) : Sanduja et al.

It is certified that error appears in the above-identified patent and that said Letters Patent is hereby corrected as shown below:

Column 14, line 25, after the word "and", (1st occurrence) "$A^1$" should be --$Ag^1$--.

Signed and Sealed this

Eighteenth Day of June, 1996

Attest:

BRUCE LEHMAN

Attesting Officer         *Commissioner of Patents and Trademarks*